(12) United States Patent
Miyatake et al.

(10) Patent No.: US 6,392,802 B2
(45) Date of Patent: *May 21, 2002

(54) OPTICAL FILM AND OPTICAL ELEMENTS

(75) Inventors: Minoru Miyatake; Takafumi Sakuramoto, both of Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/730,859

(22) Filed: Dec. 7, 2000

(30) Foreign Application Priority Data

Dec. 8, 1999 (JP) .......................... 11-348538

(51) Int. Cl.⁷ ............................................. G02B 27/28
(52) U.S. Cl. ....................................... 359/494; 359/497
(58) Field of Search ................................. 359/487, 494, 359/495, 497

(56) References Cited

U.S. PATENT DOCUMENTS

| | | | |
|---|---|---|---|
| 5,751,388 A | 5/1998 | Larson | 349/96 |
| 5,783,120 A | 7/1998 | Ouderkirk et al. | 264/1.34 |
| 5,825,542 A * | 10/1998 | Cobb, Jr. et al. | 359/497 |
| 5,825,543 A * | 10/1998 | Ouderkirk | 359/494 |
| 5,867,316 A | 2/1999 | Carlson et al. | 359/500 |
| 5,991,077 A | 11/1999 | Carlson et al. | 359/500 |
| 5,999,239 A | 12/1999 | Larson | 349/96 |
| 6,031,665 A | 2/2000 | Carlson et al. | 359/494 |

* cited by examiner

*Primary Examiner*—Cassandra Spyrou
*Assistant Examiner*—Leo Boutsikaris
(74) *Attorney, Agent, or Firm*—Sughrue Mion, PLLC

(57) ABSTRACT

An optical film is disclosed which is reduced in diffuse reflection while retaining anisotropy in the scattering of a linearly polarized light and is practically usable in a light diffuser film or viewing-side polarizing film for liquid crystal displays and the like. The optical film comprises a light-transmitting resin and dispersedly contained therein minute regions differing from the light-transmitting resin in birefringent characteristics, wherein the difference in refractive index between the minute regions and the light-transmitting resin in a direction perpendicular to the axis direction in which a linearly polarized light has a maximum transmittance, $\Delta n^1$, is from 0.03 to 0.5 and that in the maximum-transmittance axis direction, $\Delta n^2$, is smaller than 0.03, and the diffuse reflectance of linearly polarized light in the $\Delta n^1$ direction is lower than 30%. Also disclosed are: an optical element comprising two or more layers of the optical film, wherein the layers are superposed such that the $\Delta n^1$ directions for any of the layers are parallel to those for the adjacent layers; and an optical element comprising a multilayer structure which comprises at least one of a polarizing film, retardation film, transparent resin plate, and reflecting layer and one or more layers of the optical film.

11 Claims, 1 Drawing Sheet

OPTICAL FILM AND OPTICAL ELEMENTS

FIELD OF THE INVENTION

The present invention relates to an optical film useful in a light diffuser film, polarizing film or the like, and to optical elements using the optical film.

BACKGROUND OF THE INVENTION

Optical films have been known which comprise a matrix and dispersedly contained therein regions having anisotropy in refractive index and are anisotropic with respect to the scattering of linearly polarized light (see U.S. Pat. Nos. 2,123,902, 5,783,120, 5,825,543, and 5,867,316). In this type of optical film, one of two lights linearly polarized in respective directions perpendicular to each other is forcedly scattered and the other only is caused to pass therethrough. However, there has been a problem that it is difficult to use these optical films in the light diffuser film or viewing-side polarizing film of a liquid crystal display or the like because use thereof in this application results in enhanced backward diffuse reflection and a reduced contrast.

SUMMARY OF THE INVENTION

Accordingly, one object of the invention is to provide an optical film which is reduced in diffuse reflection while retaining anisotropy in the scattering of a linearly polarized light and is practically usable in a light diffuser film or viewing-side polarizing film for liquid crystal displays and the like.

Another object of the present invention is to provide an optical element using the optical film.

The invention provides an optical film comprising a light-transmitting resin and dispersedly contained therein minute regions differing from the light-transmitting resin in birefringent characteristics, wherein the difference in refractive index between the minute regions and the light-transmitting resin in a direction perpendicular to the axis direction in which a linearly polarized light has a maximum transmittance, $\Delta n^1$, is from 0.03 to 0.5 and that in the maximum-transmittance axis direction, $\Delta n^2$, is smaller than 0.03, and the diffuse reflectance of linearly polarized light in the $\Delta n^1$ direction is lower than 30%.

The invention further provides: an optical element comprising two or more layers of the optical film, wherein the layers are superposed such that the $\Delta n^1$ directions for any of the layers are parallel to those for the adjacent layers; an optical element comprising a multilayer structure which comprises at least one of a polarizing film and a retardation film and one or more layers of the optical film, an optical element comprising a multilayer structure which comprises a transparent resin plate and., disposed on one or each side thereof, one or more layers of the optical film; and an optical element which comprises one layer of or two or more superposed layers of the optical film and a reflecting layer disposed thereon.

The optical film according to the invention has the following excellent anisotropy in scattering. In the axis direction in which a linearly polarized light has a maximum transmittance ($\Delta n^2$ direction), the linearly polarized light passes through the optical film while satisfactorily retaining its polarized state. In directions ($\Delta n^1$ directions) perpendicular to the $\Delta n^2$ direction, the linearly polarized light is scattered based on the difference in refractive index $\Delta n^1$ between the light-transmitting resin and the minute regions, whereby the polarized state is diminished or eliminated. Based on this anisotropy in scattering, light loss by absorption and heat generation by light absorption can be prevented. In addition, the optical film is reduced in diffuse reflection. Consequently, even when used in the light diffuser film or viewing-side polarizing film of a liquid crystal display or the like, the optical film is less apt to cause a decrease in contrast.

1, 13, 14, 15: Optical film
11: Light-transmitting resin
12: Minute region
2, 22, 23, 24: Adhesive layer
3: Optical part

DETAILED DESCRIPTION OF THE INVENTION

Figure 1:
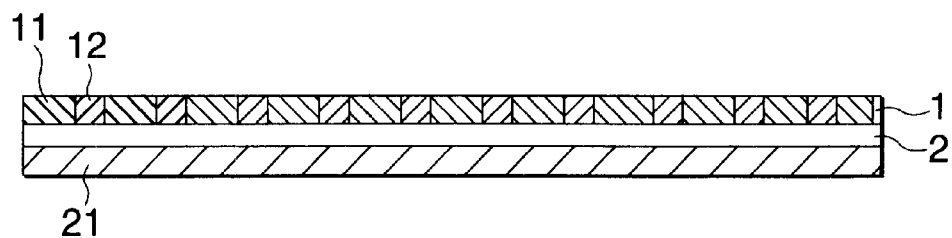
FIG. 1 is a sectional view of one embodiment of the optical film.

The optical film according to the invention comprises a light-transmitting resin and dispersedly contained therein minute regions differing from the light-transmitting resin in birefringent characteristics, wherein the difference in refractive index between the minute regions and the light-transmitting resin in a direction perpendicular to the axis direction in which a linearly polarized light has a maximum transmittance, $\Delta n^1$, is from 0.03 to 0.5 and that in the maximum-transmittance axis direction, $\Delta n^2$, is smaller than 0.03, and the diffuse reflectance of linearly polarized light in the $\Delta n^1$ direction is lower than 30%. An embodiment of the optical film is shown in FIG. 1, wherein numeral 1 denotes the optical film, 11 a light-transmitting resin, and 12 a minute region. Numeral 2 denotes an adhesive layer consisting of a pressure-sensitive adhesive layer and 21 denotes a separator provisionally covering the pressure-sensitive adhesive layer.

For forming the optical film, the following method can, for example, be used. One or more light-transmitting resins are mixed with one or more appropriate materials for forming minute regions, e.g., polymers or liquid crystals, which are highly transparent and differ from the light-transmitting resins in birefringent characteristics. From this mixture is formed a film consisting of the light-transmitting resins dispersedly containing the materials as minute regions. According to need, this film is subjected to an appropriate orientation treatment such as stretching to form regions having different birefringent characteristics.

The light-transmitting resins are not particularly limited, and suitable transparent resins can be used. Examples thereof include polyester resins, styrene resins such as polystyrene and acrylonitrile/styrene copolymers (AS polymers), olefin resins such as polyethylene, polypropylene, ethylene/propylene copolymers, and polyolefins having cyclic or norbornene structures, carbonate resins, acrylic resins, vinyl chloride resins, cellulosic resins, amide resins, imide resins, sulfone resins, polyethersulfone resins, polyetheretherketone resins, poly(phenylene sulfide) resins, vinyl alcohol resins, vinylidene chloride resins, vinyl butyral resins, acrylate resins, polyoxymethylene resins, silicone resins, urethane resins, and blends of these. Examples thereof further include thermosetting or ultraviolet-curable polymers such as phenolic, melamine, acrylic, urethane, urethane-acrylic, epoxy, and silicone polymers.

Consequently, the light-transmitting resins may be ones which are less apt to have orientational birefringence attributable to molding strain or the like (isotropic polymers) or may be ones which are apt to have such orientational birefringence (anisotropic polymers). Preferred are resins which are highly transparent in the visible region. Preferred from the standpoint of heat resistance are resins having a deformation-under-load temperature of 80° C. or higher and a glass transition temperature of 110° C. or higher, preferably 115° C. or higher, more preferably 120° C. or higher. The deformation-under-load temperature is measured in accordance with JIS K 7207 through a test in which a test piece having a height of 10 mm placed in a heating bath is heated by heating the heating medium at a rate of 2° C./min while imposing a bending stress of 18.5 kgf/cm$^2$ on the test piece. The deformation-under-load temperature of the test piece is defined as the temperature of the heating medium at the time when the amount of deflection of the test piece has reached 0.32 mm.

As the materials for: forming minute regions, suitable polymers, liquid crystals, or the like can be used which form regions differing in birefringent characteristics from the light-transmitting resin to be used in combination therewith. Examples of such combinations include a combination of a polymer and a liquid crystal, combination of an isotropic polymer and an anisotropic polymer, and a combination of anisotropic polymers. From the standpoint of even distribution of minute regions, it is preferred to use a combination which undergoes phase separation. The distribution of minute regions can be regulated by selecting a combination of materials having a suitable degree of compatibility. Phase separation can be accomplished by a suitable technique such as a method in which incompatible materials are dissolved in a solvent to prepare a solution thereof or a method in which incompatible materials are melt-mixed with each other with heating.

In the case where a film consisting of a combination of a polymer and a liquid crystal or a combination of an isotropic polymer and an anisotropic polymer is oriented by stretching, an optical film having the desired properties can be formed by conducting the stretching at any desired temperature and any desired stretch ratio. In the case of a film consisting of a combination of anisotropic polymers, an optical film having the desired properties can be formed by stretching it under suitably regulated conditions. Although anisotropic polymers are classified as positive or negative polymers by change in stretch-direction refractive index, either positive or negative anisotropic polymers can be used in the invention. Either a combination of positive or negative anisotropic polymers or a combination of a positive anisotropic polymer and a negative anisotropic polymer can be used.

Examples of the polymer to be used in combination with a liquid crystal include the light-transmitting resins enumerated above. On the other hand, examples of the liquid crystal include low molecular weight liquid crystals and crosslinkable liquid crystal monomers which both show a nematic or smectic phase at room or high temperatures, such as cyanobiphenyl, cyanophenylcyclohexane, cyanophenyl ester, phenyl benzoate, and phenylpyrimidine type liquid crystals and mixtures of these, and liquid crystal polymers showing a nematic or smectic phase at room or high temperatures. Those crosslinkable liquid crystal monomers are usually oriented and then crosslinked by appropriate means such as heat or light to give polymers.

From the standpoint of obtaining an optical film excellent in heat resistance, durability, and other properties, it is preferred to use a polymer having a glass transition temperature of 50° C. or higher, preferably 80° C. or higher, more preferably 120° C. or higher or to use a crosslinkable liquid crystal monomer or a liquid crystal polymer. The kind of the liquid crystal polymer is not particularly limited, and an appropriate liquid crystal polymer of the main chain type or side chain type can be used. A liquid crystal polymer advantageously usable from the standpoints of the formation of minute regions having excellent uniformity in particle diameter and of thermal stability, suitability for film formation, ease of orientation, etc. is one having a degree of polymerization of 8 or higher, preferably 10 or higher, more preferably from 15 to 5,000.

For forming an optical film using one or more liquid crystal polymers, the following method can, for example, be used. One or more light-transmitting resins are mixed with one or more liquid crystal polymers for forming minute regions. From this mixture is formed a film dispersedly containing the liquid crystal polymers as minute regions. This film is oriented by an appropriate technique to form regions having different birefringent characteristics. In this case, from the standpoint of regulating the refractive index differences $\Delta n^1$ and $\Delta n^2$ through orientation, it is preferred to use liquid crystalline thermoplastic resins which have a glass transition temperature of 50° C. or higher and show a nematic liquid crystal phase in a range of temperatures lower than the glass transition temperatures of the light-transmitting resins to be used in combination therewith. Examples thereof include side chain type liquid crystal polymers having monomer units represented by the following general formula:

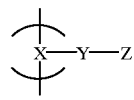

wherein X is a backbone group which constitutes the main chain of the liquid crystal polymer and may be formed by appropriate linkage groups such as linear, branched, or cyclic groups. Examples thereof include polyacrylates, polymethacrylates, poly(α-haloacrylate)s, poly(α-cyanoacrylate) s, polyacrylamides, polyacrylonitriles, polymethacrylonitriles, polyamides, polyesters, polyurethanes, polyethers, polyimides, and polysiloxanes.

Y is a spacer group branching from the main chain. From the standpoint of forming an optical film while regulating refractive index and from other standpoints, preferred examples of the spacer group Y include ethylene, propylene, butylene, pentylene, hexylene, octylene, decylene, undecylene, dodecylene, octadecylene, ethoxyethylene, and methoxybutylene.

On the other hand, Z is a mesogenic group imparting the property of liquid crystalline alignment. Examples thereof include the following groups. The terminal substituent A in the following groups may be an appropriate substituent such as a cyano, alkyl, alkenyl, alkoxy, or oxaalkyl group or an alkyl, alkoxy, or alkenyl group in which one or more of the hydrogen atoms are replaced with fluorine or chlorine atoms.

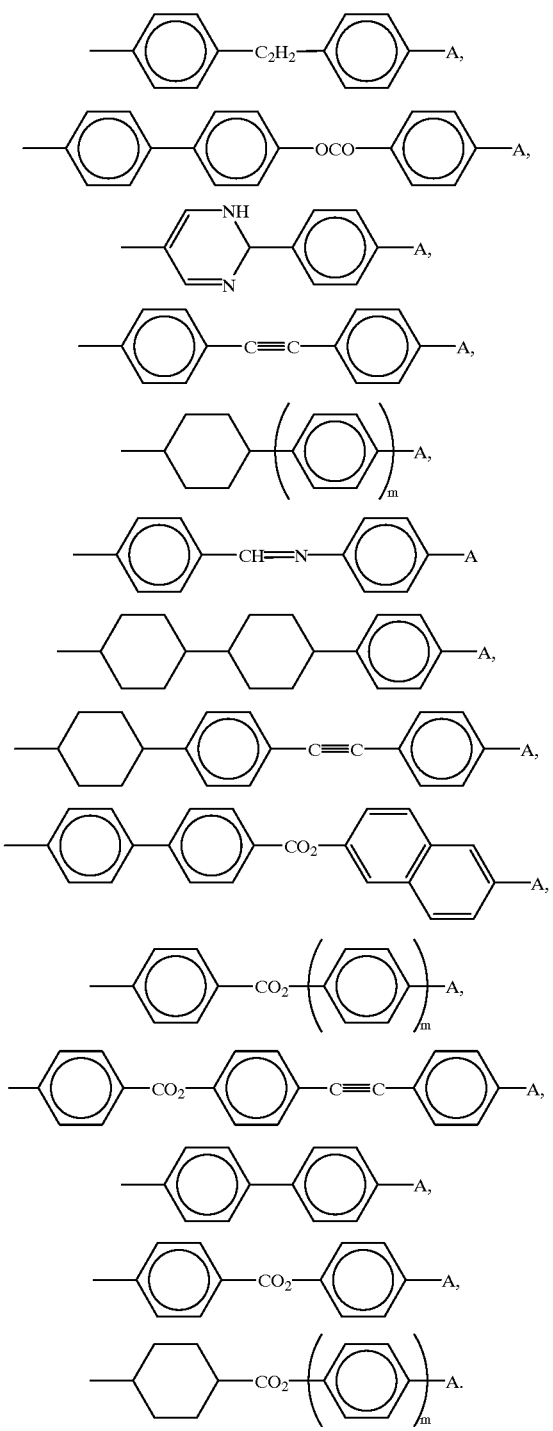

In those monomer units, the spacer group Y and the mesogenic group Z may be bonded to each other through an ether bond, —O—. Furthermore, in the phenyl groups contained in the mesogenic group Z, one or two hydrogen atoms may be replaced with a halogen. In this case, the halogen is preferably chlorine or fluorine. The side chain type liquid crystal polymers undergoing nematic orientation may be any appropriate thermoplastic resins such as homo- or copolymers having monomer units represented by the general formula given above. Preferred among these polymers are those excellent in monodomain orientation.

For forming an optical film containing a nematic liquid crystal polymer, the following method can, for example, be used. A light-transmitting resin for film formation is mixed with a liquid crystal polymer which shows a nematic liquid crystal phase in a range of temperatures lower than the glass transition temperature of the light-transmitting resin and has a glass transition temperature of 50° C. or higher, preferably 60° C. or higher, more preferably 70° C. or higher. From this mixture is formed a film dispersedly containing the liquid crystal polymer as minute regions. Thereafter, the liquid crystal polymer constituting these minute regions is heated to bring the polymer into a nematic liquid crystal phase, and this orientation is fixed by cooling.

The film dispersedly containing minute regions, i.e., the film to be oriented, can be obtained by an appropriate technique such as casting, extrusion molding, injection molding, rolling, or flow casting. It is also possible to obtain the film by spreading a monomer mixture and polymerizing the spread mixture by heating or irradiation with a radiation such as ultraviolet.

From the standpoint of obtaining an optical film containing highly evenly distributed minute regions and from other standpoints, a preferred method is to use a solution of a mixture of resins in a solvent to form a film therefrom through casting, flow casting, or another technique. In this case, the size and distribution of minute regions can be regulated by changing the kind of the solvent, viscosity of the resin mixture solution, rate of drying of the spread resin mixture solution layer, etc. For example, an advantageous technique for reducing the area of minute regions is to use a resin mixture solution having a reduced viscosity or to dry a spread resin mixture solution layer at an increased rate.

The thickness of the film to be oriented can be suitably determined. However, from the standpoints of suitability for orientation and others, the thickness thereof is generally from 1 $\mu$m to 3 mm, preferably from 5 $\mu$m to 1 mm, more preferably from 10 to 500 $\mu$m. In forming the film, appropriate additives can be incorporated, such as a dispersant, surfactant, ultraviolet absorber, color tone regulator, flame retardant, release agent, and antioxidant.

Orientation can be accomplished by conducting one or more appropriate treatments capable of regulating refractive index through orientation, as described above. Examples of the orientation treatments include: stretching treatments such as uni- or biaxial stretching, successive biaxial stretching, and stretching along a Z axis; a rolling treatment; a technique in which an electric or magnetic field is applied to the film held at a temperature not lower than the glass transition temperature or liquid crystal transition temperature thereof and the film is then rapidly cooled to fix the orientation; a technique in which polymer molecules are oriented during film formation by means of flow orientation; and a technique in which a liquid crystal is caused to orient by itself based on the slight orientation of an isotropic polymer. Consequently, the optical film obtained may be a stretched film or unstretched film. Although a brittle light-transmitting resin can be used in obtaining a stretched film, it is especially preferred to use a light-transmitting resin having excellent stretchability.

In the case of a film containing a liquid crystal polymer as minute regions, orientation can be accomplished by, for example, a method comprising heating the film to a temperature at which the liquid crystal polymer dispersedly contained therein as minute regions melts and shows the desired liquid crystal phase, e.g., nematic phase, orienting the molecules of the liquid crystal polymer under the influence of an orientation-regulating force, and then rapidly cooling the film to fix the oriented state. Preferably, this oriented state of the minute regions is as close as possible to a monodomain state, for example, from the standpoint of eliminating fluctuations of optical properties. The orientation-regulating force to be used can be an appropriate force capable of orienting the liquid crystal polymer. Examples thereof include a stretching force which is applied by stretching the film in an appropriate stretch ratio, a shearing force applied during film formation, an electric field, and a magnetic field. One or more of such orientation-regulating forces can be used to orient the liquid crystal polymer.

Consequently, the part other than the minute regions in the optical film may be birefringent or isotropic. An optical film which is wholly birefringent can be obtained, for example, by using a resin which becomes birefringent upon orientation as a film-forming light-transmitting resin and conducting molecular orientation or the like during film formation as described above. According to need, known means for orientation such as stretching can be further conducted to impart or control birefringence. On the other hand, an optical film in which the part other than the minute regions is isotropic can be obtained, for example, by using an isotropic resin as a film-forming light-transmitting resin and stretching a film thereof at a temperature not higher than the glass transition temperature of the light-transmitting resin.

The optical film according to the invention is regulated in refractive index differences in in-plane directions, $\Delta n^1$ and $\Delta n^2$, between the minute regions and the light-transmitting resin. Specifically, the difference in refractive index between the minute regions and the light-transmitting resin in a direction perpendicular to the axis direction in which a linearly polarized light has a maximum transmittance, $\Delta n^1$, is from 0.03 to 0.5 and that in the maximum-transmittance axis direction, $\Delta n^2$, is smaller than 0.03. Furthermore, the diffuse reflectance of linearly polarized light in the $\Delta n^1$ direction is lower than 30%. By regulating the optical film so as to have such properties, the film can have the excellent ability to scatter light in $\Delta n^1$ directions and, in the $\Delta n^2$ direction, it enables the light to maintain a polarized state and pass therethrough without being deflected. Namely, the film can be reduced in diffuse reflection while retaining anisotropy in scattering.

From the standpoint of anisotropy in the scattering of a linearly polarized light, the difference in refractive index in a $\Delta n^1$ direction, $\Delta n^1$, which indicates the degree of scattering of a linearly polarized light, is generally from 0.035 to 0.45, preferably from 0.040 to 0.40, more preferably from 0.05 to 0.30. In this case, from the standpoint of inhibiting backward scattering (diffuse reflection) to thereby transmit the scattered light forward, it is preferred to regulate the content of the minute regions in the. film to generally 30% by volume or lower, preferably from 0.5 to 28% by volume, more preferably from 1 to 25% by volume.

Furthermore, the size of the minute regions, in particular the length thereof in $\Delta n^1$ directions, which are directions of scattering, also relates to backward scattering. From the standpoint of transmitting scattered visible light forward, the $\Delta n^1$-direction length of the minute regions is preferably not shorter than the wavelengths of visible light, more preferably from 0.5 to 500 $\mu$m, most preferably from 1 to 250 $\mu$m. The minute regions are preferably dispersed and distributed as evenly as possible in the film from the standpoints of homogeneity of the scattering effect, etc. The minute regions, which are present usually as domains in the optical film, are not particularly limited in their lengths in the $\Delta n^2$ and other directions.

In an optical film which is preferred from the standpoints of the efficiency of light utilization, perceptibility, and others, the diffuse reflectance of linearly polarized light in a $\Delta n^1$ direction is generally 20% or lower, preferably 10% or lower, more preferably 5% or lower, the total transmittance of linearly polarized light in the $\Delta n^1$ direction is generally 70% or higher, preferably 80% or higher, more preferably 90% or higher, and the total transmittance of linearly polarized light in the $\Delta n^2$ direction, in which linearly polarized light is less scattered, is generally 80% or higher, preferably 85% or higher, more preferably 90% or higher.

In the case where the light-transmitting resin constituting the film is optically isotropic, the difference in refractive index between the minute regions with respect to each optical axis direction and the part other than the minute regions means the difference between the refractive index of the minute regions in each optical axis direction and the average refractive index of the film. In the case where the light-transmitting resin constituting the film is optically anisotropic, that difference in refractive index means the difference in refractive index in each axis direction between the minute regions and the resin because the direction of the main optical axis for the film usually coincides with the direction of the main optical axis for the minute regions.

Figure 2:
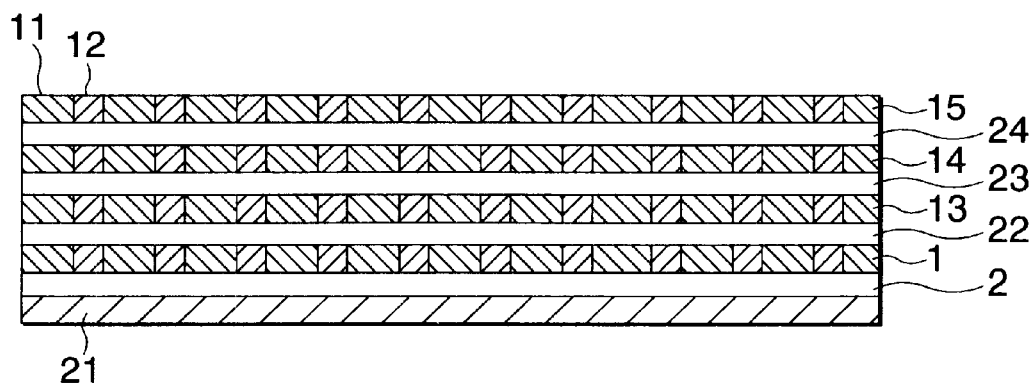
FIG. 2 is a sectional view of one embodiment of the optical elements.

As shown in FIG. 1, the optical film may be constituted of a single layer of the film 1, which is anisotropic in scattering as described above, or may be formed as an optical element comprising two or more superposed layers of this film. An example of this optical element is shown in FIG. 2, wherein numerals 1, 13, 14, and 15 each denotes an optical film and 2, 22, 23, and 24 each denotes an adhesive layer. The superposition of optical films can bring about a synergistic scattering effect higher than the scattering effect expected from the thickness increase. This multilayer structure may be obtained by superposing optical films while positioning each film at any desired angle with respect to, e.g., the $\Delta n^1$ or $\Delta n^2$ direction. However, from the standpoints of enhancing the scattering effect, etc., it is preferred to superpose the films in such a manner that the $\Delta n^1$ directions for any film layer are parallel to those for the adjacent layers. The number of superposed optical films can be appropriate number of 2 or larger.

The films to be superposed may have the same or different values of $\Delta n^1$, $\Delta n^2$, etc. With respect to the parallelism in, e.g., $\Delta n^1$ direction between adjacent layers, fluctuations of parallelism caused by operational errors are allowable, although a higher degree of parallelism is preferred. In the case of a layer having fluctuations in, e.g., $\Delta n^1$ direction, the parallelism is based on the average of these. The superposed films may be in a merely stacked state. It is, however, preferred that the optical films have been bonded to each other through an adhesive layer or the like from the standpoints of preventing film shifting in, e.g., $\Delta n^1$ directions and preventing foreign substances from coming into each interface and from other standpoints. For the bonding, an appropriate adhesive can be used, such as a hot-melt or pressure-sensitive adhesive. From the standpoint of diminishing reflection loss, an adhesive layer whose refractive index is as close as possible to that of the films is preferred. It is also possible to bond the films with the same polymer as the resin constituting either the films or the minute regions.

From the standpoint of preventing a change in optical properties and other standpoints, it is preferred to use an adhesive which can be cured or dried without necessitating high-temperature processing or a prolonged treatment and which does not pose the problem of delamination under high-temperature or high-humidity conditions. From this standpoint, preferred examples of adhesives for use in the bonding include transparent pressure-sensitive adhesives such as acrylic, silicone, polyester, polyurethane, polyether, and rubber-based pressure-sensitive adhesives.

Especially preferred examples thereof include an acrylic pressure-sensitive adhesive comprising as the base polymer an acrylic polymer having a weight-average molecular weight of 100,000 or higher obtained by copolymerizing an alkyl (meth)acrylate having an alkyl group having 20 or less carbon atoms, such as methyl, ethyl, or butyl, with a modifier ingredient such as (meth)acrylic acid or hydroxyethyl (meth)acrylate in such a combination as to result in a glass transition temperature of 0° C. or lower. Acrylic pressure-sensitive adhesives have the advantage of being excellent in transparency, weatherability, heat resistance, and other properties.

For forming a pressure-sensitive adhesive layer on an optical film, an appropriate method can be used. Examples thereof include a method in which the components of a pressure-sensitive adhesive are dissolved or dispersed in an appropriate solvent to prepare an adhesive fluid and this adhesive fluid is directly applied on an optical film by an appropriate spreading technique, e.g., casting or coating, and a method in which a pressure-sensitive adhesive layer is formed on a separator in the manner shown above and is then transferred to an optical film. The pressure-sensitive adhesive layer to be formed may be composed of two or more superposed layers which differ in composition, kind, etc.

The thickness of the adhesive layer to be formed, e.g., pressure-sensitive adhesive layer, can be suitably determined according to the adhesive strength thereof, etc. The thickness thereof is generally from 1 to 500 μm, preferably from 5 to 100 μm. It is possible to incorporate a natural or synthetic resin, a filler comprising glass fibers, glass beads, or the like, and appropriate additives such as an antioxidant into the pressure-sensitive adhesive layer according to need. Furthermore, fine particles may be incorporated to form a pressure-sensitive adhesive layer having light-diffusing properties.

The optical film according to the invention and the superposed layers of the film can be used in various applications intended to form or regulate a polarized light, such as, e.g., a polarizing. film, based on their property of transmitting/scattering a linearly polarized light. For example, in the case where the optical film or superposed layers thereof are used in or as a polarizing film, they have an advantage of being less apt to heat up or deteriorate because they differ from dichroic absorption type polarizing films and the like in the principle of polarized light formation and are hence less apt to absorb. light, as stated hereinabove. Furthermore, the optical film and the superposed layers have the possibility of improving the efficiency of light utilization when the light scattered thereby is reused after having been converted to a polarized light with another optical part.

Figure 3:
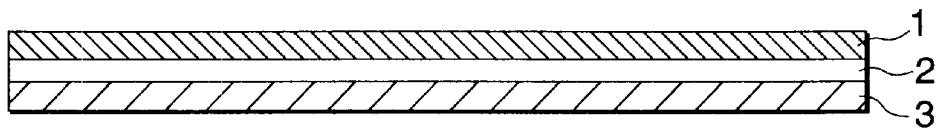
FIG. 3 is sectional view of another embodiment of the optical elements.

Consequently, the optical film according to the invention or the superposed layers of the film may be practically used also in an optical element which comprises a multilayer structure formed by disposing one or more layers of the optical film on one or each side of an appropriate optical part, e.g., a polarizing film and/or a retardation film. An example of this optical element is shown in FIG. 3, wherein numeral 3 denotes an optical part. In this multilayer structure, the components may be in a merely stacked state or may have been bonded to each other through an adhesive layer or the like. With respect to this adhesive layer, the same explanation can be given as in the superposition of optical films.

There are no particular limitations on the optical parts which may be superposed, and appropriate ones may be used. Examples thereof include a polarizing film, a retardation film, a backlight such as a light guide plate, a reflector plate, a polarizing separator plate comprising, e.g., a multilayered film, and a liquid crystal cell. Such optical parts, including a polarizing film and a retardation film, may be any of various types. Specifically, examples of the polarizing film include absorption type, reflection type, and scattering type polarizing films, while examples of the retardation film include a quarter-wavelength plate, a half-wavelength plate, a retardation film comprising a uni- or biaxially or otherwise stretched film, one comprising a film which has undergone inclined orientation, i.e., which has undergone molecular orientation also in the thickness direction, one comprising a liquid crystal polymer, one in which a phase difference caused by a viewing angle or birefringence is compensated for, and one comprising two or more of these retardation films superposed on each other. Any of these can be used in the invention.

Specific examples of the polarizing film include absorption type polarizing films obtained by adsorbing iodine or a dichroic substance, e.g., a dichroic dye, onto a hydrophilic polymer film, such as a poly(vinyl alcohol) film, a film of poly(vinyl alcohol) which has undergone partial conversion into formal, or a film of a partially saponified ethylene/vinyl acetate copolymer, and then stretching the film. Examples thereof further include oriented polyene films such as a film of dehydrated poly(vinyl alcohol) and a film of dehydrochlorinated poly(vinyl chloride).

Examples of the polarizing film still further include a polarizing film comprising any of the aforementioned polarizing films and a transparent protective layer formed on one or each side thereof for the purpose of protection against water, etc. The protective layer may be, for example, a coating layer of a light-transmitting resin. The transparent protective layer may contain fine transparent particles having an average particle diameter of, e.g., from 0.5 to 20 μm so as to impart fine roughness to the surface of the polarizing film. Examples of such particles include fine inorganic particles which may be electroconductive, such as silica, alumina, titania, zirconia, tin oxide, indium oxide, cadmium oxide, and antimony oxide particles, and fine organic particles made of a crosslinked or uncrosslinked polymer.

On the other hand, specific examples of the retardation film include stretched films made of any of the resins enumerated hereinabove with regard to the optical film or made of a liquid crystal polymer especially of the twisted alignment type. In superposing the optical film or superposed layers thereof on a polarizing film and/or a retardation film, there are no particular limitations on the relative positions thereof with respect to optical axes. In general, however, these components are superposed in such a manner that the axis of transmission of the polarizing film or the axis of retardation of the retardation film is parallel or perpendicular to the $\Delta n^1$ directions for the optical film or superposed layers thereof.

Furthermore, examples of the light guide plate include one which comprises a light-transmitting resin plate and, disposed by a side edge thereof, either a line light source such as a (cold or hot) cathode tube or a light source such as one or more light-emitting diodes or ELs and has such a constitution that the light transmitted by the resin plate is emitted from one side of the plate through diffusion, reflection, diffraction, interference, etc. The light-transmitting resin plate is not particularly limited as long as it is a plate made of an appropriate material which is transparent in the range of wavelengths for the light source. For example, it is made of any of the aforementioned light-transmitting resins usable for forming the optical film. From the standpoint of maintaining the polarization of emitted light, it is preferred to use a resin plate in which the phase difference between in-plane directions is as small as possible.

The shape of the light-transmitting resin plate is not particularly limited and can be suitably determined according to the size of a liquid crystal cell, properties of the light source, emission of light which is even in brightness, etc. Preferred from the standpoint of ease of molding are flat plates and plates having a wedge shape. The thickness of the resin plate also is not particularly limited and can be suitably determined according to the sizes of the light source, liquid crystal cell, etc. However, from the standpoints of attaining thickness and weight reductions, etc., the thickness thereof is preferably as small as possible, more preferably 10 mm or smaller, most preferably from 0.5 to 5 mm. For forming the light-transmitting resin plate, an appropriate technique can be used, such as injection molding, cast molding, extrusion molding, flowcasting, rolling, roll coating, transfer molding, or reaction-injection molding (RIM). In forming the resin plate, appropriate additives can be incorporated according to need, such as a discoloration inhibitor, antioxidant, ultraviolet absorber, and release agent.

In fabricating an optical element containing a light guide plate, use can be made of a suitable combination of the light guide plate with one or more auxiliary means disposed according to need in predetermined positions, e.g., on the upper or lower surface of the light guide plate or at a side thereof. Examples of such auxiliary means include a prism array layer which comprises a prism sheet or the like and is used for controlling the direction of light emission, a diffuser plate for obtaining even illumination, and a light source holder for introducing the light emitted by a line light source into a side edge of the light guide plate.

On the other hand, the reflecting layer formed usually on one side of the optical film or superposed layers thereof is intended to reflect the light which has passed through the optical film or superposed layer thereof or the light which has been reflected by backward scattering, etc. to thereby direct the transmitted or reflected light in the reverse direction. The reflecting layer can be a conventional appropriate one such as a metal layer having a mirror surface or a dielectric reflecting plate.

The multilayer structure contained in or constituting the optical elements according to the invention may contain one optical part or two or more optical parts. The multilayer structure may be one containing two or more optical parts of the same kind, e.g., retardation films. In this case, these optical parts of the same kind, e.g., retardation films, may have the same or different properties. In the optical element, the optical film or superposed layers thereof may be disposed in one or more appropriate positions outside or within the multilayer structure, e.g., on one or each outer side of the multilayer structure or on one or each side of an optical part contained in the multilayer structure.

In the case of an optical element containing a polarizing film, this polarizing film and the optical film or superposed layers thereof are preferably disposed in such positions that the $\Delta n^1$ or $\Delta n^2$ direction for the optical film or superposed layers thereof is parallel to the transmission axis of the polarizing film, from the standpoint of effectively utilizing the transmitting/scattering properties of the optical film and from other standpoints. With respect to this parallelism, the same explanation can be given as in the case of superposing optical films described hereinabove. In the optical element in which the $\Delta n^1$ directions for the optical film or superposed layers thereof are parallel to the transmission axis of the polarizing film, a linearly polarized light which has passed through the polarizing film can be scattered by the optical film or superposed layers thereof in the $\Delta n^1$ directions therefor. Consequently, when this optical element is applied to, for example, a liquid crystal display in such a manner that the optical element is disposed on the viewing side, with the polarizing film facing the liquid crystal cell, then it is effective in widening the viewing angle.

On the other hand, in the optical element in which the $\Delta n^2$ direction for the optical film or superposed layers thereof is parallel to the transmission axis of the polarizing film, a linearly polarized light absorbable by the polarizing film can be scattered by the optical film or superposed layers thereof in the $\Delta n^1$ directions therefor. Consequently, when this optical element is disposed, for example, in such a manner that light enters the optical film or superposed layers thereof before entering the polarizing film, then it is effective in increasing the amount of light passing through the polarizing film.

The invention will be described below in more detail by reference to the following Examples, but it should be understood that the invention is not construed as being limited thereto.

EXAMPLE 1

In a 20 wt % dichloromethane solution containing 950 parts (parts by weight; the same applies hereinafter) of a norbornene resin having a deformation-under-load temperature of 165° C. and a glass transition temperature of 182° C. (ARTON, manufactured by JSR Co., Ltd.) was dissolved 50 parts of a liquid crystalline thermoplastic resin represented by the following formula which had a glass transition temperature of 80° C. and showed a nematic liquid crystal phase in the temperature range of from 100 to 290° C. From this solution was obtained a 70 μm-thick film by casting. This film was stretched at 180° C. in a stretch ratio of 3 and then rapidly cooled to obtain an optical film having refractive index differences $\Delta n^1$ and $\Delta n^2$ of 0.230 and 0.029, respectively.

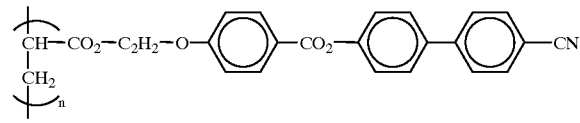

The optical film obtained above consisted of a film made of the norbornene resin and the liquid crystalline thermoplastic resin dispersed therein as domains of almost the same shape elongated along the stretch direction. The average diameter of these domains was determined through an examination with a polarizing microscope based on coloration by phase difference. As a result, the $\Delta n^1$-direction average length thereof was found to be 5 μm.

EXAMPLE 2

In a 20 wt % dichloromethane solution containing 950 parts of a polycarbonate resin having a glass transition temperature of 150° C. (PANLITE., manufactured by Teijin Ltd.) was dissolved 50 parts of a liquid crystalline thermoplastic resin represented by the following formula which had a glass transition temperature of 90° C. and showed a nematic liquid crystal phase in the temperature range of from 120 to 290° C. From this solution was obtained a 70 μm-thick film by casting. This film was stretched at 160° C. in a stretch ratio of 2 and then rapidly cooled to obtain an optical film having refractive index differences $\Delta n^1$ and $\Delta n^2$ of 0.151 and 0.012, respectively.

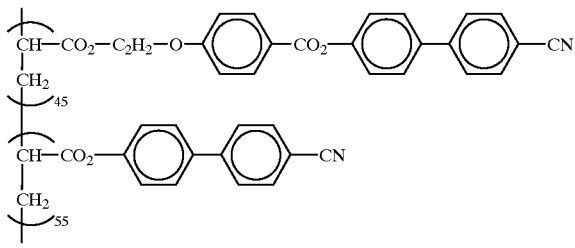

The optical film obtained above consisted of a film made of the polycarbonate resin and the liquid crystalline thermoplastic resin dispersed therein as domains of almost the same shape elongated along the stretch direction. The average diameter of these domains was determined through an examination with a polarizing microscope based on coloration by phase difference. As a result, the $\Delta n^1$-direction average length thereof was found to be 6 μm.

EVALUATION TEST

Each of the optical films obtained in the Examples was disposed in a back part of an integrating sphere and a light-absorbing layer was disposed on the back of the film. A linearly polarized light was caused to strike on the film in a $\Delta n^1$ direction to measure the reflectance of the film relative to a reference white plate. This reflectance was taken as diffuse reflectance. Furthermore, each optical film was disposed in the light entrance part of the integrating sphere, and a linearly polarized light was caused to strike on the film in the $\Delta n^1$ or $\Delta n^2$ direction to measure the total light transmittance.

The results obtained are shown in the following Table.

| | Diffuse reflectance (%) | Total light transmittance (%) | |
|---|---|---|---|
| | | $\Delta n^1$ direction | $\Delta n^2$ direction |
| Example 1 | 4 | 87 | 91 |
| Example 2 | 2 | 88 | 90 |

The Table shows that the optical films obtained in the Examples are reduced in backward scattering, and that when used as a reflecting member in a polarizing film or light diffuser film, these optical films do not cause a considerable decrease in contrast and can function satisfactorily.

What is claimed is:

1. An optical film comprising a light-transmitting resin and dispersedly contained therein minute regions differing from the light-transmitting resin in birefringent characteristics, wherein the difference in refractive index between the minute regions and the light-transmitting resin in a direction perpendicular to the axis direction in which a linearly polarized light has a maximum transmittance, $\Delta n^1$, is from 0.03 to 0.5 and that in said maximum-transmittance axis direction, $\Delta n^2$, is smaller than 0.03, and the diffuse reflectance of linearly polarized light in the $\Delta n^1$ direction is lower than 30%.

2. The optical film of claim 1, wherein the total transmittance of linearly polarized light in the $\Delta n^1$ direction is 70% or higher and that of linearly polarized light in the $\Delta n^2$ direction is 80% or higher.

3. The optical film of claim 1, wherein the content of the minute regions in the film is 30% by volume or lower.

4. The optical film of claim 1, wherein the minute regions comprise a thermoplastic resin which has a glass transition temperature of 50° C. or higher and shows a nematic liquid crystal phase in a range of temperatures lower than the glass transition temperature of the light-transmitting resin.

5. The optical film of claim 1, wherein the minute regions dispersedly contained in the light-transmitting resin are formed by phase separation and have a $\Delta n^1$-direction length of from 0.5 to 500 μm.

6. The optical film of claim 1, wherein the light-transmitting resin has a deformation-under-load temperature of 80° C. or higher and a glass transition temperature of 110° C. or higher.

7. An optical element comprising two or more layers of the optical film of claim 1, wherein said layers are superposed such that the $\Delta n^1$ directions for any of the layers are parallel to those for the adjacent layers.

8. An optical element comprising a multilayer structure which comprises at least one of a polarizing film and a retardation film and one or more layers of the optical film of claim 1.

9. The optical element of claim 8, wherein the axis of transmission of the polarizing film or the axis of retardation of the retardation film is parallel or perpendicular to the $\Delta n^1$ directions for the optical film.

10. An optical element comprising a multilayer structure which comprises a transparent resin plate and, disposed on one or each side thereof, one or more layers of the optical film of claim 1.

11. An optical element which comprises one layer of or two or more superposed layers of the optical film of claim 1 and a reflecting layer disposed thereon.

* * * * *